United States Patent Office 3,746,706
Patented July 17, 1973

---

3,746,706
ANTIINFLAMMATORY AGENTS
John Krapcho, Somerset, N.J., assignor to E. R. Squibb & Sons, Inc., New York, N.Y.
No Drawing. Continuation-in-part of application Ser. No. 871,976, Oct. 28, 1969. This application May 7, 1970, Ser. No. 35,590
Int. Cl. C07d 93/12
U.S. Cl. 260—240 F           19 Claims

ABSTRACT OF THE DISCLOSURE

Antiinflammatory agents of the formula

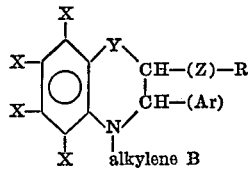

wherein X is hydrogen, halogen, alkyl, haloalkyl, alkoxy, hydroxy, alkylthio, nitro, alkylsulfonyl, amino, alkanoylamino, or mono- or dialkylamino wherein any of the foregoing alkyl or substituted alkyl radicals contain up to 8 carbon atoms; Y is —O—, —S—, —CH$_2$—, —CH$_2$CH$_2$—, —SO—, —SO$_2$—, or Y may be absent entirely; R is alkyl of up to 8 carbon atoms, cycloalkyl of from 3 to 8 carbon atoms, aryl of up to 10 carbon atoms or aralkyl of up to 10 carbon atoms; Z is

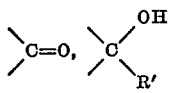

wherein R' is hydrogen, vinyl, allyl or R, or

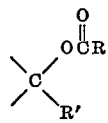

Ar is a mono- or bicyclic aryl radical selected from the group consisting of phenyl, X-substituted phenyl, alkylenedioxyphenyl, pyridyl, furyl, naphthyl or thienyl; alkylene is a straight or branched carbon chain of up to 6 carbon atoms, B is a basic nitrogen containing radical; and pharmaceutically acceptable acid-addition or quaternary ammonium salts thereof. These compounds are obtained by a novel rearrangement of an aryl substituted benzothiazinone and related compounds wherein Y is as defined above.

---

This application is a continuation-in-part of our copending application Ser. No. 871,976, filed Oct. 28, 1969, now abandoned.

OBJECTS OF THE INVENTION

It is an object of the present invention to provide new antiinflammatory agents. Another object is to provide a novel method for preparing these compounds. These and other objects of the present invention will be apparent from the following description.

DETAILED DESCRIPTION

Compounds of the present invention may be prepared by the following reaction sequence.

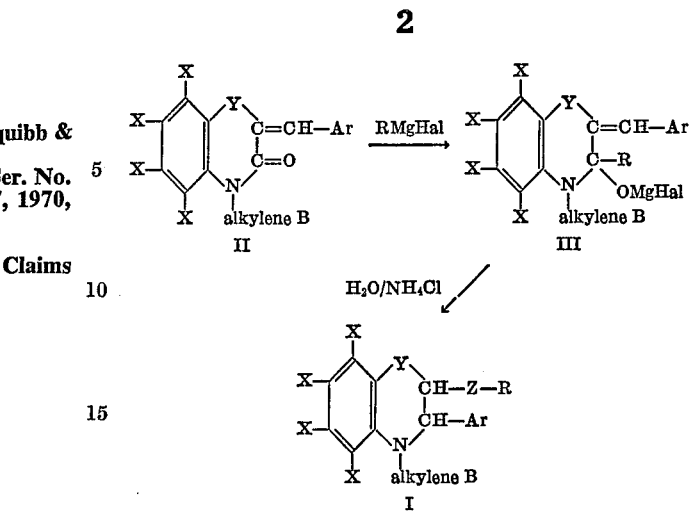

The preparation of the starting compounds of Formula II is disclosed in copending U.S. patent application Ser. No. 709,808, filed 1 Mar. 1968, now U.S. Pat. 3,635,956 granted Jan. 18, 1972.

According to the present invention, the compounds of Formula II are reacted with a Grignard reagent, such as an alkyl, cycloalkyl or aralkyl magnesium halide, or with an alkyl, aryl or aralkyl lithium, at temperatures of from about 10° C. to about 140° C., preferably from about 25° C. to about 40° C. Suitable solvents for the compound of Formula II are aromatic hydrocarbons, e.g., benzene, toluene and xylene, or ethers, e.g., tetrahydrofuran and diethylether.

The alkyl or aralkyl magnesium halide employed may be the chloride, bromide or iodide, preferably the bromide. The compound of Formula III which is formed by this reaction is recovered and treated with aqueous ammonium chloride to give the final compounds of Formula I.

The substituent X may be hydrogen, halogen, alkyl, haloalkyl, e.g., CF$_3$, alkoxy, hydroxy, alkylthio, nitro, amino, mono- or dialkylamino or alkanoylamino, e.g., acetamido. The alkyl or substituted alkyl radical may contain up to 8 carbon atoms.

Y may be oxygen, sulfur, —CH$_2$—, —CH$_2$CH$_2$—, —SO—, —SO$_2$— or may be absent entirely.

R may be alkyl of up to 8 carbon atoms, cycloalkyl of from 3 to 8 carbon atoms, or aryl or aralkyl of up to 10 carbon atoms.

The cycloalkyl radical R may be, for example, cyclopropyl, 2-methylcyclopropyl, cyclobutyl, 2-methylcyclobutyl, 2-ethylcyclobutyl, cyclopentyl, 3-methylcyclopentyl, 3-ethylcyclopentyl, cyclohexyl, 4-methylcyclohexyl, cycloheptyl and 1-methylcycloheptyl.

The aryl radical R may be a mono- or bicyclic radical such as, for example, phenyl, X-substituted phenyl wherein X is as defined above, alkylenedioxyphenyl, pyridyl, furyl, naphthyl or thienyl.

Z may be

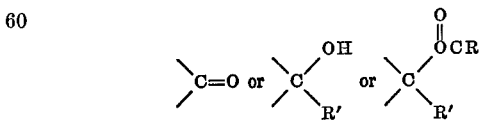

wherein R is as defined above and R' may be hydrogen, vinyl, allyl, phenyl, X-substituted phenyl wherein X is as defined above, alkylenedioxyphenyl, pyridyl, furyl, naphthyl or thienyl, or an alkyl, cycloalkyl or aralkyl radical as defined for R.

Examples of alkyl radicals for the foregoing substituents are methyl,
ethyl,
n-propyl,
i-propyl,
n-butyl,
i-butyl,
n-pentyl,
2-methyl-n-butyl,
neopentyl,
n-hexyl,
2-methyl-n-pentyl,
3-methyl-n-pentyl,
2,2-dimethyl-n-butyl,
2,3-dimethyl-n-butyl,
n-heptyl,
2-methyl-n-hexyl,
3-methyl-n-hexyl,
2,2-dimethyl-n-pentyl,
2,3-dimethyl-n-pentyl,
2,4-dimethyl-n-pentyl,
3,3-dimethyl-n-pentyl,
3-ethyl-n-pentyl,
2,2,3-trimethylbutane,
n-octyl,
2-methyl-n-heptyl,
3-methyl-n-heptyl,
4-methyl-n-heptyl,
2,3-dimethyl-n-hexyl,
2,4-dimethyl-n-hexyl,
2,5-dimethyl-n-hexyl,
2,2-dimethyl-n-hexyl,
3,5-dimethyl-n-hexyl,
2-ethyl-n-hexyl,
3-ethyl-n-hexyl,
2,2,3-trimethyl-n-pentyl,
2,2,4-trimethyl-n-pentyl,
2,3,3-trimethyl-n-pentyl,
2,3,4-trimethyl-n-pentyl
2-ethyl-3-methyl-n-pentyl,
2-methyl-3-ethyl-n-pentyl and
2,2,3,3-tetramethyl-n-butyl.

Examples of suitable aralkyl radicals are benzyl, phenethyl, isopropylphenyl, 3-phenylpropyl and isopropylbenzyl.

The substituted compounds may conveniently be obtained by preparing the starting correspondingly substituted o-aminobenzenethiol or substituted o-aminophenol, or a substituted dihydrocarbostyril, or a substituted dihydroindolone or a substituted tetrahydrobenzazepinone.

A preferred method for obtaining a final product of Formula I wherein X is amino is to reduce the corresponding nitro-substituted compound by chemical (e.g., $SnCl_2$) or catalytic hydrogenation. Treatment of the amino derivative with an acyl halide in known manner yields the corresponding derivative wherein X is acylamido.

Compounds wherein X is —OH may be prepared by treating the corresponding alkoxy compounds with hot pyridine hydrochloride in known manner.

Among the suitable radicals represented by the basic nitrogen containing radical B are the following:

amino;
(lower alkyl)amino (e.g., N-methylamino);
di(lower alkyl)amino (e.g., N,N-dimethylamino);
(hydroxy lower alkyl)amino;
(hydroxy lower alkyl) (lower alkyl)amino (e.g., N-2-hydroxyethyl-N-methylamino);
di(hydroxy lower alkyl)amino;
phenyl(lower alkyl)amino;
N-phenyl lower alkyl(lower alkyl)amino;

and saturated 5- to 7-membered monocyclic heterocyclic radicals of less than twelve carbon atoms, as exemplified by:

piperidino;
(lower alkyl)piperidino;
di(lower alkyl)piperidino;
(lower alkoxy)piperidino;
homopiperidino;
2-, 3-, or 4-piperidyl;
2-, 3-, or 4-(N-lower alkylpiperidyl);
pyrrolidino;
(lower alkyl)pyrrolidino;
di(lower alkyl)pyrrolidino;
(lower alkoxy)pyrrolidino;
2- or 3-pyrrolidyl;
2- or 3-(N-lower alkyl pyrrolidyl);
morpholino;
(lower alkyl)morpholino;
di(lower alkyl)morpholino;
(lower alkoxy)morpholino;
thiamorpholino;
(lower alkyl)thiamorpholino;
di(lower alkyl)thiamorpholino;
(lower alkoxy)thiamorpholino;
piperazino;
4-R-substituted piperazino (e.g., $N^4$-ethylpiperazino, $N^4$-phenylpiperazino, and so forth);
di(lower alkyl)amino-(lower alkyl)piperazyl (e.g., $N^4$-dimethylaminoethylpiperazino);
(lower alkyl)-piperazino (e.g., $N^4$-methylpiperazino);
di(lower alkyl)piperazino;
(lower alkoxy)piperazino;
homopiperazino; and
4-R-substituted homopiperazino (e.g., $N^4$-benzylhomopiperazino).

The lower alkyl and substituted lower alkyl radicals in the foregoing examples of suitable nitrogen containing radicals may contain up to 6 carbon atoms.

The aryl radical Ar may be phenyl, X-substituted phenyl, alkylenedioxyphenyl, pyridyl, furyl, naphthyl, or thienyl.

Examples of suitable benzaldehydes which may be employed in the preparation of the starting compounds II are the following:

o-chlorobenzaldehyde;
p-chlorobenzaldehyde;
p-fluorobenzaldehyde;
2,4-dibromobenzaldehyde;
2,4-dichlorobenzaldehyde;
2,6-dichlorobenzaldehyde;
2-bromo-4-chlorobenzaldehyde;
2,3,4,5,6-pentafluorobenzaldehyde;
2-hydroxybenzaldehyde (salicylaldehyde);
3-hydroxybenzaldehyde;
4-hydroxybenzaldehyde;
2,4-dihydroxybenzaldehyde ($\beta$-resorcylaldehyde);
2,5-dihydroxybenzaldehyde (gentisaldehyde);
3,4-dihydroxybenzaldehyde;
2-chloro-3-hydroxybenzaldehyde;
2-chloro-5-hydroxybenzaldehyde;
2-bromo-3-hydroxybenzaldehyde;
3-hydroxy-6-iodobenzaldehyde;
2,6-dichloro-3-hydroxybenzaldehyde;
4,6-dichloro-3-hydroxybenzaldehyde;
2,4,6-trichloro-3-hydroxybenzaldehyde;
2,4-dichloro-3-hydroxy-6-bromobenzaldehyde;
2-nitrobenzaldehyde;
3-nitrobenzaldehyde;
4-nitrobenzaldehyde;
3-hydroxy-4-nitrobenzaldehyde;
2-nitro-3-hydroxybenzaldehyde;
2-nitro-5-hydroxybenzaldehyde;

3-nitro-4-chlorobenzaldehyde;
2-methylbenzaldehyde (o-toluylaldehyde);
3-methylbenzaldehyde (m-methylbenzaldehyde);
4-methylbenzaldehyde (p-methylbenzaldehyde);
2-hydroxy-5-methylbenzaldehyde (homosalicylaldehyde);
2-hydroxy-3,5,6-trimethylbenzaldehyde;
2-methoxybenzaldehyde (o-anisaldehyde);
3-methoxybenzaldehyde;
4-methoxybenzaldehyde (p-anisaldehyde);
4-butoxybenzaldehyde;
2-hydroxy-3-methoxybenzaldehyde;
3,4-dimethoxybenzaldehyde (vertraldehyde);
3,4,5-trimethoxybenzaldehyde;
3-methoxy-4-hydroxybenzaldehyde (vanillin);
3-trifluoromethylbenzaldehyde;
3-methylthiobenzaldehyde;
4-ethylthiobenzaldehyde;
4-dimethylaminobenzaldehyde;
3,4-methylenedioxybenzaldehyde (piperonal);
3,4-ethylenedioxybenzaldehyde.

In addition to benzaldehydes, other aryl aldehydes which may be used in carrying out the present invention are 2-pyridinecarboxaldehyde, 3-pyridinecarboxaldehyde, 4-pyridinecarboxaldehyde, 2-thienylcarboxaldehyde, 3-thienylcarboxaldehyde, 2-fufural, α-naphthaldehyde, and β-naphthaldehyde.

The starting compounds of Formula II wherein Y is S may be prepared according to the following general reaction sequence starting from o-aminobenzenethiol or a substituted o-aminobenzenethiol:

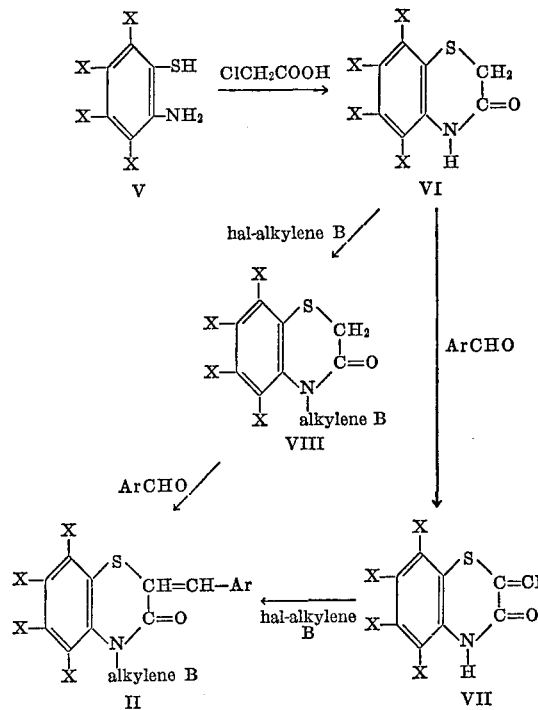

As shown above, the alkylene B moiety may be introduced prior to or subsequent to reaction with the aryl aldehyde.

Examples of suitable o-aminobenzenethiols which may be used to prepare starting compounds of Formula II wherein Y is —S— are the following:

2-aminobenzenethiol;
4-fluoro-2-aminobenzenethiol;
5-fluoro-2-aminobenzenethiol;
3,5,6-trifluoro-2-aminobenzenethiol;
3,4,5,6-tetrafluoro-2-aminobenzenethiol;
4-chloro-2-aminobenzenethiol;
5-chloro-2-aminobenzenethiol;
6-chloro-2-aminobenzenethiol;
5-bromo-2-aminobenzenethiol;
5-methyl-2-aminobenzenethiol;
6-methyl-2-aminobenzenethiol;
5-ethyl-2-aminobenzenethiol;
5-n-propyl-2-aminobenzenethiol;
5-n-hexyl-2-aminobenzenethiol;
3-hydroxy-2-aminobenzenethiol;
5-methoxy-2-aminobenzenethiol;
3,4-dimethoxy-2-aminobenzenethiol;
5-ethoxy-2-aminobenzenethiol;
5-n-propoxy-2-aminobenzenethiol;
5-n-hexyloxy-2-aminobenzenethiol;
4-ethylthio-2-aminobenzenethiol;
4-(trifluoromethyl)-2-aminobenzenethiol;
5-(trifluoromethyl)-2-aminobenzenethiol;
6-(trifluoromethyl)-2-aminobenzenethiol;
5-(trifluoromethoxy)-2-aminobenzenethiol;
4-(trifluoromethylmercapto)-2-aminobenzenethiol;
5-(trifluoromethylmercapto)-2-aminobenzenethiol;
5-nitro-2-aminobenzenethiol;
6-nitro-2-aminobenzenethiol;
2,4-diamino-5-methylthiophenol;
5-dimethylamino-2-aminobenzenethiol;
4-methylsulfonyl-2-aminobenzenethiol.

The starting compounds of Formula II wherein Y is O may be prepared in a similar manner by substituting an o-aminophenol having the formula

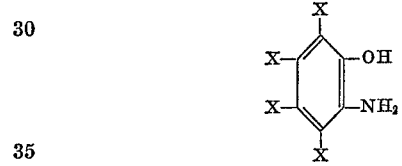

for the o-aminothiophenol in the foregoing general reaction sequence.

Examples of suitable o-aminophenols which may be used to prepare starting compounds of Formula II wherein Y is —O— are the following:

2-aminophenol;
2-amino-4-chlorophenol;
2-amino-4,6-dichlorophenol;
2-amino-3,4,5,6-tetrachlorophenol;
2-amino-4-bromophenol;
2-amino-3,5-dibromophenol;
2-amino-4,6-dibromophenol;
2-amino-4-nitrophenol;
2-amino-5-nitrophenol;
2-amino-6-nitrophenol;
2-amino-4-nitro-6-chlorophenol;
2-amino-4-chloro-5-nitrophenol;
2-amino-4-chloro-6-nitrophenol;
2-amino-4-nitro-6-bromophenol;
2-amino-4-bromo-6-nitrophenol;
2-amino-4,6-dinitrophenol;
2-amino-6-methylphenol;
2-amino-4-bromo-6-methylphenol;
2-amino-4-nitro-6-methylphenol;
2-amino-3-methylphenol;
2-amino-4-methylphenol;
2-amino-5-methylphenol;
2-amino-4,6-dinitro-5-methylphenol;
2-amino-4-methyl-6-chlorophenol;
2-amino-4-methyl-6-bromophenol;
2-amino-4-methyl-5-nitrophenol;
2-amino-5-methyl-5-nitrophenol;
2-amino-4,5-dimethylphenol;
2-amino-4,6-dimethylphenol;
2-amino-3,4,6-trimethylphenol;
2,4-diamino-3-i-propyl-6-methylphenol;
2-amino-4-methylaminophenol;

In addition o-nitrophenols can be used as starting materials from which the corresponding o-aminophenol is obtained by reduction by known methods. Examples of suitable o-nitrophenols are the following:

2-nitro-5-chlorophenol;
2-nitro-5-fluorophenol;
2-nitro-4-fluorophenol;
2-nitro-5-bromophenol;
2-nitro-5-ethylphenol;
2-nitro-5-n-hexylphenol;
2-nitro-5-methoxyphenol;
2-nitro-5-ethoxyphenol;
2-nitro-5-n-propoxyphenol;
2-nitro-5-n-hexyloxyphenol;
2-nitro-5-(triflouromethyl)phenol.

The starting compounds of Formula II wherein Y is SO or SO₂ may be prepared by oxidizing the bivalent sulfur in a compound of Formula VI to a sulfoxide or a sulfone. The techniques for such oxidations involve the use of H₂O₂ and KMnO₄, respectively, and are well known in the art.

The starting compounds of Formula II wherein Y is —CH₂— may be prepared by substituting a dihydrocarbostyril having the formula

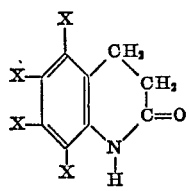

VIII for the compound of Formula VI in the foregoing general reaction sequence.

The starting compounds of Formula II wherein Y is absent may be prepared by substituting a dihydroindolone of the formula

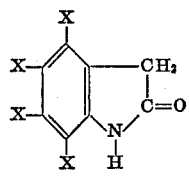

IX for the compound of Formula VI in the foregoing general reaction sequence.

The starting compounds of Formula II wherein Y is —CH₂CH₂— may be prepared by substituting a tetrahydrobenzazepinone of the formula

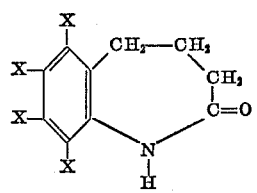

X for the compound of Formula VI in the foregoing general reaction sequence.

Compounds of Formula I wherein Z is

(compounds Ia) which may be obtained by following the general reaction sequence described above may be converted to the corresponding secondary alcohol (compounds Ib) by reducing the carbonyl

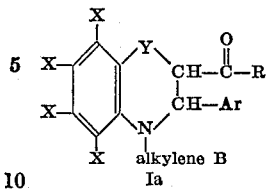
Ia

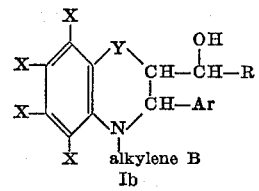
Ib

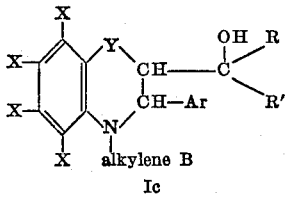
Ic group in the compounds of Formula Ia. The corresponding tertiary alcohol (compounds Ic) may be obtained by reaction of the compound of Formula Ia with the appropriate Grignard reagent.

The hydroxyl group of the compounds of Formula Ib and Ic may be esterified, for example, by use of an acid anhydride or an acyl halide of acids such as acetic, propionic or benzoic.

The compounds of the invention may be obtained as mixtures of diasteroisomeric compounds when they contain more than one asymmetric atom. Such mixtures of racemates can then be separated into individual racemic compounds.

As to the salts, those coming within the purview of this invention include the acid-addition salts of those compounds containing a basic group particularly the non-toxic acid-addition salts and the non-toxic quaternary ammonium salts. Acids useful for preparing these acid-addition salts include, inter alia, inorganic acids, such as the hydrohalic acids (e.g. hydrochloric and hydrobromic acid), sulfuric acid, nitric acid, and phosphoric acid, and organic acids such as maleic, fumaric, tartaric, citric, acetic, benzoic, 2-acetoxybenzoic, salicylic, succinic acid, theophylline, 8-chlorotheophylline, p-aminobenzoic, p-acetamidobenzoic, nicotinic, methanesulfonic or cyclohexanesulfamic. The quaternary ammonium salts include those formed with alkyl halide (e.g., methyl chloride, isobutyl bromide, dodecyl chloride and cetyl iodide), benzyl halides (e.g., benzyl chloride) and dilower alkyl sulfates (e.g., dimethyl sulfate).

The compounds of this invention are useful as antiinflammatory agents and are effective in the prevention and inhibition of granuloma tissue formation in warm blooded animals, for example in a manner similar to phenylbutazone or indomethacin. They may be used to decrease joint swelling tenderness, pain and stiffness, in mammalian species, e.g., in conditions such as rheumatoid arthritis. The compounds of this invention or a physiologically acceptable acid-addition salt thereof may be compounded according to accepted pharmaceutical practice for administration orally or by injection. Suitable oral dosage forms are tablets, capsules, elixirs, or powders, while solutions or suspensions are suitable for injection. The quantity administered may be from about 100 mg. to about 2 gm. per day in two to four divided doses, and preferably from about 100 mg. to about 1 gm. per day.

All temperatures in the present application are measured on the centigrade scale.

The following examples illustrate the present invention without, however, limiting the same thereto.

EXAMPLE 1

2-acetyl-4-(2-dimethylaminoethyl)-3,4-dihydro-3-phenyl-2H-1,4-benzothiazine, hydrochloride A solution of 27.8 g. (0.086 mole) 2-benzylidene-4-(2- dimethylaminoethyl - 2H - 1,4 - benzothiazin - 3(4H) - one (M.P. 98–100°) in 150 ml. of tetrahydrofuran at 20° is treated with 40 ml. of an ethereal solution of 3 N methyl magnesium bromide. The temperature of the solution rises to 50° and a yellow precipitate then separates from the solution. After the mixture cools to 30°, 500 ml. of anhydrous ether is added and the slurry is stirred and refluxed for 2 hours. The mixture is cooled and added to a cool solution of 15 g. of NH₄Cl in 100 ml. of water and the layers separated. The aqueous phase is extracted twice with 100 ml. of ether, the organic phases combined, dried over MgSO₄ and filtered. Evaporation of the solvent gives 28.8 g. of light brown oil. The latter is dissolved in 300 ml. of warm acetonitrile and treated with a solution of 7.6 g. of oxalic acid, in 100. of acetonitrile. The salt crystalizes from the solution, is cooled and the product is filtered and dried; weight, 31.4 g.; M.P. 175–184°. After recrystallization from 100 ml. of dimethylformamide, the pale yellow product weighed 25.1 g., M.P. 192–194°.

The base is obtained by suspending the above oxalate (23.3 g. in 100 ml. of water and treating portionwise with 15 g. of K₂CO₃ and extracting with 200 ml. of ether (three times). Evaporation of the dried (MgSO₄) ethereal solution gives 17.6 g. of pale orange semi-solid.

The hydrochloride salt, after crystallization from isopropyl alcohol, melts at 185–186°.

EXAMPLE 2

4-(2-dimethylaminoethyl)-3,4-dihydro-3-phenyl-2H-1,4-benzothiazin-2-yl ethyl ketone, hydrochloride Interaction of 18.2 g. (0.056 mole) of 2-benzylidene-4 - (2 - dimethylaminoethyl) - 2H - 1,4 - benzothiazine-3(4H)-one with 30 ml. of an ethereal solution of 2.3 N ethyl magnesium bromide in the manner described in Example 1 gives 20.0 g. of the base. The latter is purified as an oxalic acid salt, M.P. 210–212° (crystallized from dimethylformamide), and then converted to the base (yellow-brown oil) and the hydrochloride salt, M.P. 188–190° (from isopropanol).

EXAMPLE 3

4-(2-dimethylaminoethyl)-3,4-dihydro-3-phenyl-2H-1,4-benzothiazin-2-yl propyl ketone, hydrochloride A solution of 24.0 g. (0.074 mole) of 2-benzylidene-4 - (2 - dimethylaminoethyl) - 2H - 1,4 - benzothiazine in 100 ml. of tetrahydrofuran is treated with an ethereal solution of propylmagnesium bromide and the reaction carried out according to the procedure described in Example 1 to give 16.7 g. of the oxalic acid salt, M.P. 210–212° (from dimethylformamide). This material is converted to an oily base and then to a purified hydrochloride salt, M.P. 200–202° (from isopropyl alcohol).

EXAMPLE 4

2-acetyl-4-(2-dimethylaminoethyl)-3,4-dihydro-3-p-methoxy-phenyl-2H-1,4-benzothiazine, hydrochloride A solution of 20.0 g. (0.056 mole) of 4-(2-dimethylaminoethyl) - 2 - (p - methoxybenzylidene) - 2H - 1,4-benzothiazin - 3(4H) - one in 75 ml. of tetrahydrofuran is reacted with 26 ml. of 3 N methyl magnesium bromide in the same manner as described in Example 1 to give 15.0 g. of the purified oxalic acid salt, M.P. 135–137° (from acetonitrile). This material is converted to the base (orange-red syrup) and then to the hydrochloride salt, M.P. 203–205° (from acetonitrile).

EXAMPLE 5

2-acetyl-3-(p-chlorophenyl)-4-(2-dimethylaminoethyl)-3,4-dihydro-2H-1,4-benzothiazine, hydrochloride Interaction of 24.3 g. (0.68 mole) of 2-(p-chlorobenzylidene) - 4 - (2 - dimethylaminoethyl) - 2H - 1,4-benzothiazine - 3 (4H) - one in 90 ml. of tetrahydrofuran with 32 ml. of 3 N methylmagnesium bromide according to the procedure described in Example 1 gives 15 g. of the oxalic acid salt, M.P. 190–192° (from dimethylformamide). This material is converted to the base (yellow-orange oil) and then to the hydrochloride salt, M.P. 192–194° (from acetonitrile).

EXAMPLE 6

2-acetyl-4-(3-dimethylaminopropyl)-3,4-dihydro-3-phenyl-2H-1,4-benzothiazine, hydrochloride Interaction of 41.7 g. of 2-benzylidene-4-(3-dimethylaminopropyl) - 2H - 1,4 - benzothiazin - 3(4H) - one in 170 ml. of tetrahydrofuran with 60 ml. of 3 N methylmagnesium bromide according to the procedure described in Example 1 gives 30 g. of the oxalic acid salt, M.P. 170–172° (from dimethylformamide). This material is converted to the base (25 g.) and then to the hydrochloride salt, M.P. 178–180° (from ispropyl alcohol).

EXAMPLE 7

2-acetyl-3,4-dihydro-4-(3-morpholinopropyl)-3-phenyl-2H-1,4-benzothiazine, hydrochloride By utilizing the procedure described in Example 1 but substituting 2-benzylidene - 4 - (3 - morpholinopropyl)-2H-1,4-benzothiazin - 3(4H) - one for the 2-benzylidene-4 - (2 - dimethylaminoethyl) - 2H - 1,4 - benzothiazin-3(4H)-one, the title product is obtained, initially as an oxalic acid salt, M.P. 183–185° (from dimethylformamide) and then the hydrochloride, M.P. 174–176° (from acetonitrile).

EXAMPLE 8

2-acetyl-3,4-dihydro-4-[3-(4-methylpiperazino)propyl]-3-phenyl-2H-1,4-benzothiazine, hydrochloride By utilizing the procedure described in Example 1 but substituting 2-benzylidene - 4 - [3 - (4-methylpiperazino) propyl] - 2H - 1,4 - benzothiazin - 3(4H) - one for the 2-benzylidene - 4 - (2 - dimethylaminoethyl) - 2H - 1,4-benzothiazin-3(4H)-one, the title product is obtained.

EXAMPLE 9

2-acetyl-3,4-dihydro-4-(3-piperidino-2-methylpropyl)-3-phenyl-2H-1,4-benzothiazine, hydrochloride By substituting 2-benzylidene - 4 - (3 - piperidino-2-methylpropyl) - 2H - 1,4 - benzothiazin - 3(4H) - one for the 2 - benzylidene - 4 - (2 - dimethylaminoethyl)-2H-1,4-benzothiazin - 3(4H) - one, the title product is obtained.

EXAMPLE 10

2-acetyl-4-(2-dimethylaminoethyl)-3,4-dihydro-3-(2-pyridyl)-2H-1,4-benzothiazine, hydrochloride (A) 2-(2-pyridylmethylene)-2H-1,4-benzothiazin-3(4H)-one A mixture of 50.0 g. (0.30 mole) of 1,4-benzothiazin-3-one, 50 ml. of 2-pyridinecarboxaldehyde and 300 ml. of DMF is stirred and treated with 20 g. of NaOCH₃. The temperature rises to 60°. After the temperature drops to 40°, the mixture is refluxed for 3 hours (product partially crystallizes during this period), cooled to room temperature and poured into 2 l. of ice-water to give a light brown solid. The mixture is cooled overnight and the product filtered and dried, wt. 65.5 g. M.P. 222–227°. After crystallization from 100 ml. DMF—200 ml. ethanol, the pale yellow product weighs 56.4 g. M.P. 230–242°. A sample crystallized from DMF melts at 240–242°.

(B) 4-[2-(dimethylamino)ethyl]-2-(2-pyridylmethylene)-2H-1,4-benzothiazin-3(4H)-one A suspension of 56.4 g. of the above amide in 200 ml. of DMF is stirred and treated portionwise with 11.0 g. (0.22 mole) of NaH (50%). Hydrogen is evolved and the temperature rises to 50°. After the temperature drops to 40°, the mixture is heated to 70°, cooled to 25° and treated with 100 ml. of 2.8 N solution of $$ClCH_2CH_2N(CH_3)_2$$

in toluene and 2 g. of NaI. This slurry is then maintained at 100–105° for 3 hours, cooled to 20° and poured into 2 l. of cold water. The mixture is extracted with 600 and 300 ml. (twice) portions of ether. The ether phases are combined, extracted with a solution of 30 ml. of concentrated HCl in 300 ml. of water and the aqueous phase then treated portionwise with 60 g. of $K_2CO_3$. The liberated base is extracted with 200 ml. ether—50 ml. of chloroform (3 times), the extracts are combined, dried ($MgSO_4$) and filtered. Evaporation of the solvent gives 66.8 g. of residual brown oil which is digested with 100 ml. of hot hexane and cooled to give 49.1 g. of yellow solid, M.P. 95–97°.

(C) 2-acetyl-4-(2-dimethylaminoethyl)-3,4-dihydro-3-(2-pyridyl)-2H-1,4-benzothiazine, hydrochloride By treating a solution of 12 g. of material from part B in 100 ml. of tetrahydrofuran with a solution of 17 ml. of 3 N methylmagnesium bromide in ether in the same manner as described in Example 1, there is obtained 14.2 g. of base which then yields 11.1 g. of oxalate, M.P. 170–172° (from ethanol). This material is converted to the free base, M.P. 87–89° (from hexane) and then to the hydrochloride salt, M.P. 173–175° (from acetonitrile).

EXAMPLE 11

2-acetyl-4-(2-dimethylaminoethyl)-3,4-dihydro-3-(3-pyridyl)-2H-1,4-benzothiazine, hydrochloride Using the procedure of Example 10, but substituting 3-pyridinecarboxaldehyde for the 2-pyridinecarboxaldehyde in Part A, the product was obtained, first as an oxalic acid salt, M.P. 189–191° (from methanol) and then as a hydrochloride, M.P. 208–210° (from ethanol).

EXAMPLE 12

2-acetyl-4-(2-dimethylaminoethyl)-3,4-dihydro-3-(4-pyridyl)-2H-1,4-benzothiazine, hydrochloride Using the procedure of Example 10, but substituting 4-pyridinecarboxaldehyde for the 2-pyridinecarboxaldehyde in Part A, the product was obtained first as an oxalic acid salt, M.P. 170–172° (from ethanol) and then as a hydrochloride, M.P. 189–191° (from acetonitrile).

Utilizing the procedure of Example 10 but substituting for the 2-pyridinecarboxaldehyde in Part A the indicated aldehyde shown in column I, the designated 2-acetyl-4-(2-dimethylaminoethyl)-3,4-dihydro-3(aryl)-2H-1,4-benzothiazine is obtained wherein the 3-aryl substituent is indicated in column II.

| | I | II |
|---|---|---|
| Example | Aldehyde | 3-arylsubstituent |
| 13 | 2-thiophenecarboxaldehyde | 2-thienyl. |
| 14 | 2-furancarboxaldehyde | 2-furyl. |
| 15 | 5-chloro-2-furancarboxaldehyde | 5-chloro-2-furyl. |
| 16 | 3,4-methylenedioxybenzaldehyde | 3,4-methylenedioxyphenyl. |
| 17 | 1-naphthaldehyde | 1-naphthyl. |
| 18 | 4-ethylbenzaldehyde | 4-ethylphenyl. |
| 19 | 2,4-dichlorobenzaldehyde | 2,4-dichlorophenyl. |
| 20 | 3-trifluorobenzaldehyde | 3-trifluorophenyl. |
| 21 | 3,4,5-trimethoxybenzaldehyde | 3,4,5-trimethoxyphenyl. |
| 22 | 4-methylthiobenzaldehyde | 4-methylthiobenzaldehyde. |
| 23 | 2-nitrobenzaldehyde | 2-nitrophenyl. |
| 24 | 2,3,4,5,6-pentafluorobenzaldehyde | 2,3,4,5,6-pentafluorophenyl. |
| 25 | 4-dimethylaminobenzaldehyde | 4-dimethylaminophenyl. |

Utilizing the procedure in Example 10, but substituting for the 1,4-benzothiazin-3-one in Part A the following materials: 5,6-dimethoxy-, 6-ethylthio-, 7-trifluoromethyl- 6-methyl-, and 5,6,7,8-tetrafluoro-1,4-benzothiazin-3-one, there is obtained.

Examples: Product
26 _____ 2 - acetyl - 5,6 - dimethoxy-4-(2-dimethylaminoethyl) - 3,4 - dihydro - 3-(2-pyridyl)-2H-1,4-benzothiazine.
27 _____ 2 - acetyl - 6 - ethylthio-4-(2-dimethylaminoethyl) - 3,4 - dihydro-3-(2-pyridyl)-2H-1,4-benzothiazine.
28 _____ 2 - acetyl - 4 - (2-dimethylaminoethyl)-3,4 - dihydro - 3-(2-pyridyl-7-trifluoromethyl-2H-1,4-benzothiazine.
29 _____ 2 - acetyl - 4 - (2)-dimethylaminoethyl)-3,4 - dihydro - 8-methyl-3-(2-pyridyl)-2H-1,4-benzothiazine.
30 _____ 2 - acetyl - 4-(2-dimethylaminoethyl)3,4-dihydro - 3 - (2-pyridyl)-5,6,7,8-tetrafluoro-2H-1,4-benzothiazine.

Following the procedure of Example 10, but substituting the 1,4-benzothiazin-3(4H)-one in Part A with the following materials: 1,4-benzoxazine-3-one, 7-methoxy-3,4-dihydrocarbostyril, and 1-benzazepin-2-one, the following compounds are obtained:

Examples: Product
31 _____ 2 - acetyl - 4-(2-dimethylaminoethyl)-3,4-dihydro - 7 - methoxy-3-(2-pyridyl)-2H-1,4-benzoxazine.
32 _____ 3 - acetyl - 1-(2-dimethylaminoethyl)-2-(2 - pyridyl) - 1,2,3,4 - tetrahydroquinoline.
33 _____ 3 - acetyl - 1 - (2-dimethylaminoethyl)-2-(2 - pyridyl) - 2,3,4,5-tetrahydro-1H-benzazepine.

EXAMPLE 34

4-(2-dimethylaminoethyl-α-methyl-3-phenyl-2H-1,4-benzothiazine-2-methanol, hydrochloride To a stirred solution of 17.6 g. of the base derived from Example 1 in 200 ml. of methanol is added portionwise 5.2 g. of $NaBH_4$. A cold water bath is used to maintain the temperature below 40°. After the addition is complete, the mixture is stirred at room temperature for 2 hours and the solvent removed on a rotary evaporator. The residue is treated with 100 ml. of water and the product is extracted with 100 ml. of ether (3 times). The ether phases are combined, washed with 25 ml. of cold water (twice), dried ($MgSO_4$), filtered and the solvent evaporated to give 16.6 g. of base. IR spectra indicate complete reduction of the CO group. The base is dissolved in 1 l. of ether and treated with one equivalent of ethereal HCl to give a cream-colored solid weighing 16.8 g., M.P. 100–105°. The material is suspended in 50 ml. of acetonitrile. Most of the material is rapidly dissolved and then separated as a granular solid. After cooling overnight, the solid is filtered, washed with cold acetonitrile and ether to give 12.7 g. of nearly colorless product, M.P. 195–197°.

EXAMPLE 35

4 - (2 - dimethylaminoethyl) - 3,4 - dihydro - α,α - dimethyl - 3-phenyl-2H-1,4-benzothiazine-2-methanol, hydrochloride A stirred solution of 12.5 g. of the free base of Example 1 in 100 ml. of tetrahydrofuran is treated with 40 ml. of an ethereal solution of 3 N methyl magnesium bromide and then refluxed for 7 hours. After cooling to room temperature, the mixture is poured into a solution of 45 g. of $NH_4Cl$ in 250 ml. of cold water. The product is then isolated according to the procedure described in Example 1 to give 11.9 g. of the oxalic acid salt, M.P. 227–229° (from acetonitrile). This material is converted to the free base (8.4 g.) and then to the HCl salt (7.9 g.), M.P. 107–110° (from chloroform-ether).

EXAMPLE 36

4-(2-dimethylaminoethyl)-α,3-diphenyl-α-methyl-2H-1,4-benzothiazine-2-methanol

Following the procedure of Example 35 but utilizing phenylmagnesium bromide in lieu of methyl magnesium bromide, the desired product is obtained.

EXAMPLE 37

2-acetyl-4-(2-dimethylaminoethyl)-3,4-dihydro-3-phenyl-2H-1,4-benzothiazine-1-oxide, hydrochloride By treating a solution of Example 1 in dilute acetic acid with an equivalent quantity of hydrogen peroxide, the title product is obtained.

EXAMPLE 38

2-acetyl-4-(2-dimethylaminoethyl)-3,4-dihydro-3-phenyl-2H-1,4-benzothiazine-1,1-dioxide, hydrochloride By treating an aqueous solution of the material from Example 1 with $KMnO_4$ (or a chloroform solution with m-chloroperbenzoic acid), the title product is obtained.

EXAMPLE 39

2-acetyl-4-(2-dimethylaminoethyl)-3,4-dihydro-3-phenyl-2H-1,4-benzothiazine, methobromide By treating the free base of Example 1 in acetonitrile with methyl bromide, the desired product is obtained.

EXAMPLE 40

2-acetyl-3-(o-aminophenyl)-4-(2-dimethylaminoethyl)-3,4-dihydro-2H-1,4-benzothiazine, hydrochloride Interaction of the material from Example 23 with $SnCl_2$ in dilute hydrochloric acid solution gives the title product.

EXAMPLE 41

2-acetyl-3-(o-acetamidophenyl)-4-(2-dimethylaminoethyl)-3,4-dihydro-2H-1,4-benzothiazine, hydrochloride By reacting a chloroform solution of the material from Example 40 with an equivalent quantity of acetyl chloride, the title product is obtained.

EXAMPLE 42

2-acetyl-4-(2-dimethylaminoethyl)-3,4-dihydro-3-(3,4,5-trihydroxyphenyl)-2H-1,4-benzothiazine, hydrochloride A mixture of the material from Example 21 is heated with pyridine hydrochloride at 100–200° to give the title product.

EXAMPLE 43

2 - acetyl - 4 - (2 - dimethylaminoethyl) - 3,4-dihydro- 6 - methane - sulfonyl - 3 - (2 - pyridyl) - 2H - 1,4-benzothiazine Utilizing the procedure in Example 10, but substituting 6-methanesulfonyl-1,4-benzothiazin-3-one in Part A for the 1,4-benzothiazin-3-one, the title product is obtained.

EXAMPLE 44

4-(2-dimethylaminoethyl)-3,4-dihydro-3-phenyl-2H-1,4-benzothiazin-2-yl butyl ketone, hydrochloride Following the procedure of Example 1 but substituting a solution of n-butyl magnesium bromide for the methyl magnesium bromide solution, the product is obtained.

EXAMPLE 45

4 - (2 - dimethylaminoethyl) - 3,4 - dihydro - α - methyl- 3 - phenyl - α - vinyl - 2H - 1,4 - benzothiazine - 2-methanol, hydrochloride Following the procedure of Example 35, but substituting a solution of vinyl magnesium bromide in ether for the methyl magnesium bromide, the title product is obtained.

EXAMPLE 46

α - allyl - 4 - (2 - dimethylaminoethyl) - 3,4 - dihydro-α-methyl - 3 - phenyl-2H-1,4-benzothiazine-2-methanol, hydrochloride By substituting an equivalent quantity of a solution of allyl magnesium chloride in ether for the methyl magnesium bromide in Example 35, the title product is obtained.

EXAMPLE 47

3-acetyl-1-(2-dimethylaminoethyl)-2-(2-pyridyl) indoline

Utilizing the procedure of Example 10, but substituting 2-indolinone for the 1,4-benzothiazin-3-one in Part A, the title product is obtained.

EXAMPLE 48

4-(2-dimethylaminoethyl)-3,4-dihydro-3-phenyl-2H-1,4-benzothiazin-2-yl benzyl ketone, hydrochloride Following the procedure of Example 44, but substituting a solution of benzyl magnesium chloride in ether for the n-butyl magnesium bromide, the title product is obtained.

EXAMPLE 49

2 - acetyl - 6 - chloro - 4 - (3-dimethylaminopropyl)-3,4-dihydro-3-phenyl-2H-1,4-benzothiazine, hydrochloride Utilizing the procedure of Example 10, but substituting 6 - chloro - 1,4 - benzothiazin-3-one in place of 1,4-benzothiazin-3-one, and dimethylaminopropyl chloride for dimethylaminoethyl chloride, the title product is obtained, M.P. 197–199° (from isopropyl alcohol).

EXAMPLE 50

2-acetyl-3-(p-chlorophenyl)-4-(3-dimethylaminopropyl)-3,4-dihydro-2H-1,4-benzothiazine, hydrochloride Interaction of 104 g. (0.28 mole) of 2-(p-chlorobenzylidene) - 4-(3-dimethylaminopropyl)-2H-1,4-benzothiazine-3(4H)-one in 500 ml. of tetrahydrofuran with 130 ml. of 3 M methyl magnesium bromide according to the procedure of Example 1 gives 66 g. of this oxalic acid salt, M.P. 82–84° (from acetonitrile). This material is converted to the base (oil) and then to a hydrochloride salt, M.P. 187–189° (from acetonitrile).

EXAMPLE 51

2-benzoyl-4-(2-dimethylaminoethyl)-3,4-dihydro-3-phenyl-1,4-benzothiazine, hydrochloride A solution of 20.0 g. (0.06 mole) of 2-benzylidene-4-(2-dimethylaminoethyl)-1,4-benzothiazine in 200 ml. of tetrahydrofuran is treated with 40 ml. of 2.3 N phenyllithium in 70:30 benzene-ether and the reaction then carried out according to the procedure described in Example 1 to give 17.5 g. of the oxalic acid salt, M.P. 213–215° (from dimethylformamide). This material is converted to an oily base and then to a purified hydrochloride, M.P. 213–215° (from ethanol).

EXAMPLE 52

4-(2-dimethylaminoethyl)-3,4-dihydro-α,3-diphenyl-1,4-benzothiazine-2-methanol, hydrochloride Treatment of the material from Example 51 with $NaBH_4$ in the same manner as described in Example 34 gives the title product.

EXAMPLE 53

4-(3-dimethylaminopropyl)-3,4-dihydro - α - methyl - 3-phenyl-2H - 1,4 - benzothiazine - 2 - methanol, hydrochloride and isomers A stirred solution of 35.4 g. of the free base of Example 6 in 400 ml. of methanol is treated portionwise with 10 g. of sodium borohydride in the manner described in Example 34 to give 22.6 g. of cream-colored solid, M.P. 194–197° (after trituration with acetonitrile).

Part of the above hydrochloride (10 g.) is crystallized from 500 ml. of acetonitrile to give 4.9 g. of colorless product (designated as Isomer A) M.P. 223–225°.

Concentration of the filtrate from the 4.9 g. of material to 200 ml. gives 2.3 g. of Isomer B, M.P. 194–196°. After recrystallization from 30 ml. of acetonitrile, the colorless product weighs 1.6 g., M.P. 204–206°.

EXAMPLE 54

4-(3-dimethylaminopropyl) - 3,4 - dihydro - α - methyl-3-phenyl-2H-1,4 - benzothiazine - 2 - methanol acetate ester, hydrochloride A mixture of 4 g. of material from Example 53 (M.P. 194–197°), 20 ml. of acetic anhydride and 4 ml. of pyridine is refluxed for 15 minutes, cooled and diluted to 200 ml. with ether to give a gum which becomes solid. It weighs 4.2 g., M.P. 177–180°. After crystallization from isopropyl alcohol, the colorless solid melts at 190–192°.

EXAMPLE 55

4-(3-dimethylaminopropyl) - 3,4 - dihydro - α - methyl-3-phenyl-2H-1,4-benzothiazine - 2 - methanol benzoate ester, hydrochloride A mixture of equivalent quantities of the material from Example 53 and benzoyl chloride in chloroform is refluxed for one hour and the solvent removed under reduced pressure to give the product.

What is claimed is:
1. A compound of the formula

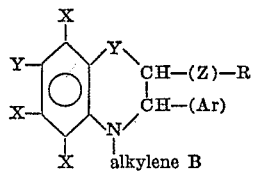

wherein X is hydrogen, halogen, alkyl, haloalkyl, alkoxy, hydroxy, alkylthio, nitro, alkylsulfonyl, amino, alkanoylamino or mono- or dialkylamino wherein any of the foregoing radicals having an alkyl moiety contains up to 8 carbon atoms; Y is —S—, —CH$_2$—, —SO—, or —SO$_2$—, R is alkyl of up to 8 carbon atoms, cycloalkyl of from 3 to 8 carbon atoms, aryl selected from the group consisting of phenyl, X-substituted phenyl wherein X is as defined previously, alkylenedioxyphenyl, pyridyl, furyl, thienyl, and naphthyl, or aralkyl selected from the group consisting of benzyl, phenethyl, isopropylphenyl, 3-phenylpropyl and isopropylbenzyl; Z is

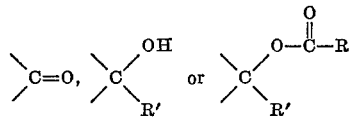

wherein R is as defined above and wherein R' is hydrogen, vinyl, allyl, phenyl, X-substituted phenyl, alkylenedioxyphenyl, pyridyl, furyl, naphthyl or thienyl, or an alkyl, cycloalkyl or aralkyl radical as defined for R; Ar is phenyl, X-substituted phenyl, alkylenedioxyphenyl, pyridyl, furyl, naphthyl or thienyl; alkylene is a straight or branched carbon chain of up to 6 carbon atoms; B is a basic nitrogen containing radical selected from the group consisting of amino, (lower alkyl)amino, di(lower alkyl) amino, (hydroxy lower alkyl) (lower alkyl)amino, di-(hydroxy lower alkyl)amino, phenyl(lower alkyl)amino, N-phenyl lower alkyl(lower alkyl)amino, piperidino, (lower alkyl)piperidino, di(lower alkyl)piperidino, (lower alkoxy)piperidino, homopiperidino, 2-, 3- or 4-pyridyl, 2-, 3- or 4-(N-lower alkyl piperidyl), pyrrolidino, (lower alkyl)pyrrolidino, di(lower alkyl)pyrrolidino, (lower alkoxy)pyrrolidino, 2- or 3-pyrrolidyl, 2- or 3-(N-lower alkyl pyrrolidyl), morpholino, (lower alkyl)morpholino, di(lower alkyl)morpholino, (lower alkoxy)morpholino, thiamorpholino, piperazino, 4-R-substituted piperazino, di(lower alkyl)amino(lower alkyl) piperazino, (lower alkyl)piperazino, di(lower alkyl)piperazino, (lower alkoxy)piperazino, the lower alkyl and substituted lower alkyl radicals in B having up to 6 carbon atoms; and pharmaceutically acceptable acid-addition or quaternary ammonium salts thereof.

2. A compound according to claim 1 wherein Y is —S—.

3. A compound according to claim 1 wherein Z is

4. A compound according to claim 1 wherein Z is

5. A compound according to claim 4 wherein R' is hydrogen.

6. A compound according to claim 4 wherein R' is phenyl.

7. A compound according to claim 4 wherein R' is alkyl of up to 8 carbon atoms or aralkyl selected from the group consisting of benzyl, phenethyl, isopropylphenyl, 3-phenylpropyl and isopropylbenzyl.

8. A compound according to claim 1 wherein Ar is phenyl, X-substituted phenyl, alkylene dioxyphenyl, pyridyl, thienyl, furyl, or naphthyl.

9. A method for preparing a compound according to claim 1 comprising treating a compound of the formula

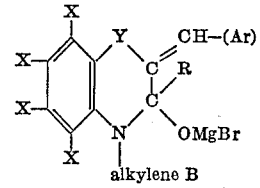

with aqueous NH$_4$Cl.

10. A method according to claim 9 wherein the compound having the formula

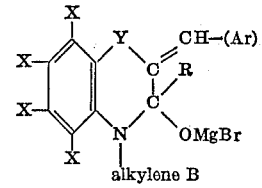

is obtained by treating a compound having the formula

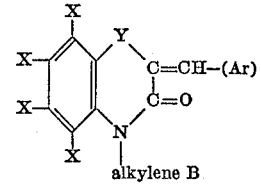

with an alkyl or aralkyl magnesium halide.

11. A method according to claim 10 wherein an alkyl, aryl or aralkyl lithium is employed in place of the aralkyl magnesium halide.

12. A compound of the formula

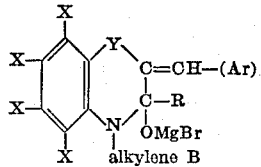

wherein X, Ar and alkylene B are as defined in claim 1.

13. A compound according to claim 1 having the name 2-acetyl - 4 - (2-dimethylaminopropyl) - 3,4 - dihydro-3-phenyl-2H-1,4-benzothiazine.

14. A compound according to claim 1 having the name 2-acetyl - 4 - (2-dimethylaminoethyl)-3,4-dihydro-3-(4-pyridyl)-2H-1,4-benzothiazine.

15. A compound according to claim 1 having the name 4-(2-dimethylaminopropyl) - α - methyl - 3 - phenyl-2H-1,4-benzothiazine-2-methanol.

16. A compound according to claim 1 having the name 4-(2 - dimethylaminoethyl) - 3,4 - dihydro-α,α-dimethyl-3-phenyl-2H-1,4-benzothiazine-2-methanol.

17. A compound according to claim 1 having the name 2-acetyl - 3,4 - dihydro-4-(3-morpholinopropyl)-3-phenyl-2H-1,4-benzothiazine.

18. A compound according to claim 1 having the name 2-benzoyl - 4 - (2-dimethylaminoethyl) - 3,4 - dihydro-3-phenyl-1,4-benzothiazine.

19. A compound according to claim 1 having the name 4-(3 - dimethylaminopropyl) - 3,4 - dihydro-α-methyl-3-phenyl-2H-1,4-benzothiazin-2-methanol.

References Cited

UNITED STATES PATENTS 3,471,481    10/1969    Krapcho _____ 260—240 D

FOREIGN PATENTS 883,599    12/1961    Great Britain ____ 260—326.15
959,203    5/1964    Great Britain _____ 260—326.15

OTHER REFERENCES

Chemical Abstracts, vol. 72, p. 322, abstract No. 21702g (1970). (Abstract of Ger. Offen. 1,910,302 published Sept. 25, 1969.)

JOHN D. RANDOLPH, Primary Examiner

U.S. Cl. X.R.

260—239 B, 293.3 D, 243 R, 244 R, 247, 247.1, 247.5 B, 268 BC, 268 BQ, 326.11, 999